US008370428B1

(12) United States Patent
Bayliss et al.

(10) Patent No.: US 8,370,428 B1
(45) Date of Patent: Feb. 5, 2013

(54) SYSTEM AND METHODS FOR DEVELOPING, PROVISIONING AND ADMINISTERING COMPOSITE MOBILE APPLICATIONS COMMUNICATING IN REAL-TIME WITH ENTERPRISE COMPUTING PLATFORMS

(75) Inventors: Paul Richard Bayliss, Hoboken, NJ (US); Daniel Eric Zeck, Colts Neck, NJ (US); Thai Rath, Trenton, NJ (US); Michael Drob, Scotch Plains, NJ (US); Shu-Wai Chow, Red Bank, NJ (US)

(73) Assignee: Antenna Software, Inc., Jersey City, NJ (US)

( * ) Notice: Subject to any disclaimer, the term of this patent is extended or adjusted under 35 U.S.C. 154(b) by 31 days.

(21) Appl. No.: 12/822,844

(22) Filed: Jun. 24, 2010

Related U.S. Application Data

(60) Provisional application No. 61/220,043, filed on Jun. 24, 2009, provisional application No. 61/288,802, filed on Dec. 21, 2009.

(51) Int. Cl.
*G06F 15/16* (2006.01)
(52) U.S. Cl. .......................... 709/203; 709/220; 455/411
(58) Field of Classification Search .................. 709/203, 709/206; 705/330, 339; 455/411
See application file for complete search history.

(56) References Cited

U.S. PATENT DOCUMENTS

| 5,970,475 | A  | * | 10/1999 | Barnes et al. ............... 705/26.35 |
| 8,014,770 | B2 | * | 9/2011 | Fritsch et al. ............... 455/422.1 |
| 2006/0121880 | A1 | * | 6/2006 | Cowsar et al. ................ 455/406 |
| 2006/0129691 | A1 | * | 6/2006 | Coffee et al. ................. 709/230 |
| 2007/0203736 | A1 | * | 8/2007 | Ashton ............................. 705/1 |
| 2009/0198588 | A1 | * | 8/2009 | White et al. ..................... 705/26 |
| 2009/0287920 | A1 | * | 11/2009 | Fernandez et al. ............ 713/151 |
| 2010/0049537 | A1 | * | 2/2010 | Erie et al. ........................... 705/1 |

* cited by examiner

*Primary Examiner* — Patrice Winder
*Assistant Examiner* — Tauqir Hussain
(74) *Attorney, Agent, or Firm* — Paul J. Sutton; Barry G. Magidoff

(57) ABSTRACT

The present invention teaches a system & methods for developing & administering composite mobile applications communicating in real-time with enterprise computing platforms comprising combinations of the steps of transmitting a data message, intended for delivery to a mobile client device, from an enterprise server computer to a gateway computer system, receiving at the gateway computer system the data message, recording receipt of the data message in a transaction log at the gateway computer system, determining a mode of delivery of the data message from the gateway computer system to the mobile client device, transmitting the data message from the gateway computer system to the mobile client device via the determined mode of delivery, and recording the transmission of the data message to the mobile client device in the transaction log at the gateway computer system.

10 Claims, 22 Drawing Sheets

SYSTEM AND METHODS FOR DEVELOPING, PROVISIONING AND ADMINISTERING COMPOSITE MOBILE APPLICATIONS COMMUNICATING IN REAL-TIME WITH ENTERPRISE COMPUTING PLATFORMS

This application claims the benefit of priority pursuant to 35 U.S.C. 119(e) from U.S. provisional patent application having Application No. 61/220,043 filed Jun. 24, 2009 and U.S. provisional patent application having Application No. 61/288,802 filed Dec. 21, 2009.

TECHNICAL FIELD

This invention relates to mobile computing devices, and in particular to a system and methods for real time communication of mobile (portable) multifunction devices with one or more existing and/or newly established enterprise servers, as well as enrolling, provisioning and administering users and their associated mobile devices via a central gateway system.

BACKGROUND ART

It is known that business organizations often implement one or more computing systems referred to as enterprise servers, each of which will perform a multitude of essential business services for that organization. For example, an enterprise server implemented by a company that delivers packages may provide package delivery scheduling and address information. Another enterprise server for that same delivery company may provide employee benefit-related information, and yet another may provide email and/or instant messaging communications.

As the mobility of the workforce increases, so does the requirement for mobile employees to have access to a variety of data stored on such enterprise servers, so they may execute their required functions. For example, a truck driver for a package delivery company will require up to date information on his or her (to avoid unnecessary verbiage, the terms "his", "him" and "he" as used hereinafter should be construed as encompassing both males and females, and is not meant to be in any manner discriminatory) delivery routes, the location of and task(s) required at package pickup stops, and the like. Additionally, it has grown increasingly important for these mobile employees to be able to provide real time data back to their associated enterprise servers as they execute their work tasks, such as real-time package delivery confirmation, requests for routing information, and the like.

The mobile computing and cell phone industries have made available a multitude of different mobile devices, including in particular recent advances in what are commonly referred to as "smartphones", such as those marketed under the trademarks APPLE IPHONE (and IPOD TOUCH), the BLACKBERRY, the PALM, as well as Windows Mobile devices such as, by way of example only, the SYMBOL MC70 and HTC's TILT. Likewise, computer manufacturers provide small, lightweight mobile computers known as tablets and netbooks, in addition to well known laptop computers. In addition to these general purpose units, other application-specific mobile devices have proliferated. The environments within which the present invention is capable of functioning include any number of existing as well as emerging Web clients such as, without limitation, hypertext markup language (HTML5, for example), environments incorporating "persistence" characteristics which facilitate retention of data structures between program executions, and those employing asynchronous server communications, to name but a few.

Accordingly, there is an increasing need for business organizations to enable their mobile employees to use mobile devices for real-time data exchange with one or more enterprise servers. In particular, there is a need to enable such mobile employees to use one or more of standard, available off-the-shelf mobile devices to interoperate with businesses' enterprise server(s). It is also desired to be able to enroll, provision (configure) and manage such mobile devices in a seamless, efficient manner.

BRIEF SUMMARY OF THE INVENTION

The present invention provides a system and method for exchanging data between mobile devices and servers in a centralized manner that is adaptable and is able to interoperate with newly developed technologies. The system and method of the present invention can be implemented with a centralized server such as a central gateway to exchange data between the mobile devices and servers. The central gateway, capable of communicating with the mobile devices and the servers via respective communication networks, is able to enroll, authenticate and configure the mobile devices through the use of its various modules that communicate with the mobile devices and the servers in accordance with a particular protocol. One example of such a protocol is a Simple Certificate Enrollment Protocol (SCEP). The configuration of the mobile devices involves the automatic downloading of applications onto the mobile devices where at least some of such applications are able to communicate with each other within a mobile device. Further at least some of the downloaded applications comprise a number of applications encased in an application native to the mobile devices enabling a mobile device onto which said encased applications have been downloaded to execute the encased applications simultaneously. The system and method of the present invention is further able to log data messages being exchanged between the mobile devices and servers where such messages are transmitted and received in accordance with a protocol that allows the servers to push the data messages to the mobile devices as desired.

BRIEF DESCRIPTION OF THE DRAWINGS

FIG. 5 illustrates a Login screen for what according to the present invention is illustrated under applicant's label or trademark AMP "ENTERPRISE WORKBENCH" native IPHONE application;

FIG. 6 illustrates a Home screen of the AMP ENTERPRISE WORKBENCH with several web apps executing;

FIG. 7 illustrates a Peer listing used in the instant messaging ("IM") Application;

FIG. 8 illustrates the Peer listing of FIG. 7 with a pop-up menu additionally displayed;

FIG. 9 illustrates a Start of Day screen;

FIG. 10 illustrates a Route screen which indicates to a driver the delivery outlets that he/she is scheduled to make for the day;

FIG. 11 illustrates the Route screen of FIG. 10 that has been updated with an additional outlet during the driver's workday;

FIG. 12 illustrates an Outlet Detail screen;

FIG. 13 illustrates the direct calling link from the Outlet Detail screen of FIG. 12;

FIG. 14 illustrates the Outlet Directions screen that may be accessed from the Outlet Detail screen of FIG. 12;

FIG. 15 illustrates the Outlet Directions screen (map view) that may be accessed from the Outlet Detail screen of FIG. 12;

FIG. 16 illustrates the Add Time Entry screen that may be accessed from the Outlet Detail screen of FIG. 12;

FIG. 17 illustrates the Close Outlet screen that may be accessed from the Outlet Detail screen of FIG. 12;

FIG. 18 illustrates the Invoice screen that may be accessed from the Close Outlet screen of FIG. 17;

FIG. 19 illustrates the Signature capture screen that may be accessed from the Invoice screen of FIG. 18;

FIG. 20 illustrates the Close of Day screen that may be accessed from the Outlet Detail screen of FIG. 12;

FIG. 21 illustrates the Expense List web application that may be accessed from the Home screen of FIG. 6 or from a tab bar shortcut from any screen;

FIG. 22 illustrates the Expense Detail screen that may be accessed from the Expense List screen of FIG. 21;

FIG. 23 illustrates an IPHONE screen with the Workbench app loaded;

FIG. 24 illustrates an IPHONE screen during the initial device enrollment process;

FIG. 25 illustrates an IPHONE screen with three exemplary web apps that are available after the enrollment process;

FIG. 26 illustrates the main page of the first web app of FIG. 25;

FIG. 27 illustrates the main page of the second web app of FIG. 25;

FIG. 28 illustrates the main page of the third web app of FIG. 25;

FIG. 29 is a flow diagram of the device enrollment and web app provisioning process;

FIG. 30 is a block diagram of an exemplary asynchronous HTTP session between the Antenna Mobility Platform and a web client or IPHONE mobile device;

FIG. 31 is a functional block diagram of the IPHONE mobile device enrollment and provisioning software modules in the central gateway that are used in the process of FIG. 28.

DETAILED DESCRIPTION OF THE INVENTION

Central Gateway System

In one aspect, the present invention provides at the system level for a central gateway system ("gateway") that interfaces with a multitude of enterprise servers and mobile devices (sometimes referred to herein as mobile clients) in order to provide real-time data exchange with the enterprise servers and the mobile clients, transaction logging, mobile device enrollment and provisioning, as well as a number of other functions as will be described herein. The gateway provides the mechanism for an enterprise server to communicate with a mobile device and vice versa. By providing the gateway and the services related thereto, a business organization does not need to implement its own dedicated solution for enabling interoperation of its enterprise servers with its mobile clients; it can utilize the infrastructure provided by the central gateway system in a much more efficient and robust manner. The scope of the present invention contemplates multi-tenant applications.

Figure 1:
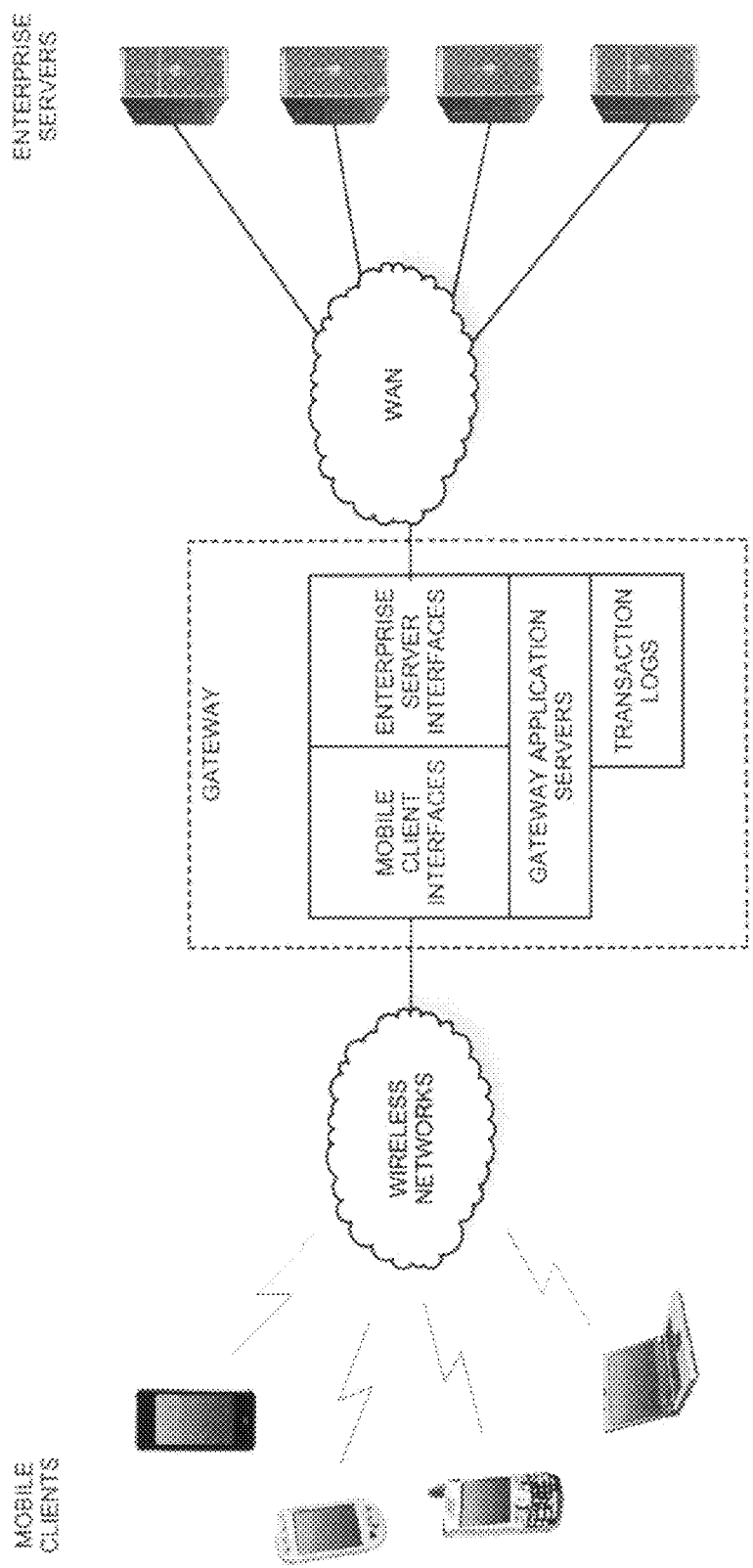
FIG. 1 is a logical block diagram of a system according to the present invention.

FIG. 1 is an illustration, in logical block diagram form, of the overall system of an embodiment of the present invention. The gateway sub-system is central to this system, and provides a means of communication between one or more enterprise servers and a multitude of mobile client devices that are deployed with mobile employees in the field. The gateway is able to communicate with the enterprise servers through a wide area network (WAN) such as the Internet, in a manner well known in the art. The gateway is also able to communicate with the mobile clients in the field through various wireless (or wired if required) networks, depending upon the capabilities of the mobile device utilized. For example, the IPHONE currently operates over a GSM network, while other devices may use a CDMA network. The gateway is adaptable to be able to interoperate with newly developed technologies as they may be developed from time to time.

Figure 4:
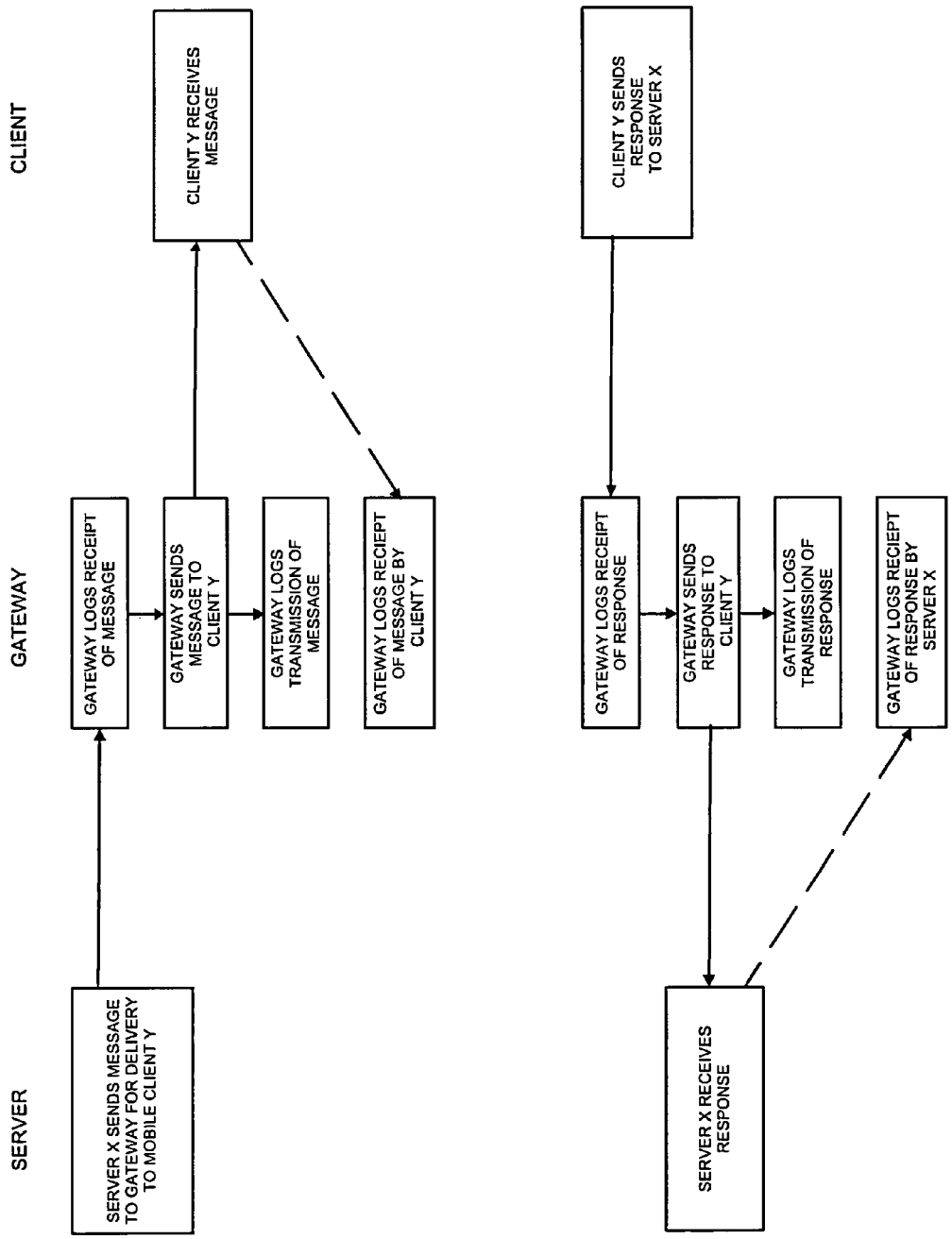
FIG. 4 is a flowchart of a typical data flow between a server, gateway, and mobile client.

As described herein, the gateway controls and logs the data flow between enterprise servers and mobile clients. A basic data transaction occurs as follows, and is illustrated in the flowchart of FIG. 4. In this and in other examples herein, in accordance with the capabilities of preconfiguration and administration, and for illustration purposes only, this specification will give the reader the impression that the components and system of the present invention exhibit human "intelligence" when functioning according to their intended purposes. Assume that Server X "wants to" send a message to Client Y, and "expects" a response from Client Y. For example, the message may be an instruction to pick up a package from a customer along the driver's delivery route. Such a message is sent to the gateway from Server X, and the gateway receives the message and creates an entry with a time stamp of the transaction in the transaction log. Then, the message is formatted for delivery to Client Y and is sent to Client Y, and this step of sending is also recorded in the transaction log at the gateway. Assuming that Client Y receives the message, that receipt event is also logged in the transaction log at the gateway.

At some time thereafter, the driver processes the message and generates a response for transmission back to the Server X. This response is sent to the gateway, and the gateway receives it, logs it, and then transmits it to Server X. As described, each and all of these transactions are preferably, but not necessarily, time stamped and logged at the gateway.

According to yet another aspect, the present invention provides for the following features and functionality, which are more fully described herein.

Central Configuration of Mobile Devices

The present invention provides for the ability of a system administrator to be able to configure and administer all of the associated mobile devices via the gateway. In one embodiment of the invention that utilizes the IPHONE as a portable multifunction device, the mobile user will be able to download a single enterprise application from the ITUNES APP STORE, using a procedure known in the art. Execution of this single enterprise application will cause the IPHONE to communicate with the gateway, and additional applications (web apps) will be automatically loaded and provisioned onto that user's device. This aspect of the invention allows easy and robust management of the mobile devices through the system administrator's ability to control which mobile user will be entitled to receive which particular applications. The criteria for such system administrator decisions may be based, for example, upon the user's role in the company (truck drivers get manifest A of applications, while field supervisors get manifest B of applications, etc.). By providing for this central configuration of associated mobile devices, the system administrator may also easily provision, configure, upgrade, and/or delete data and/or applications as desired. For example, a system administrator may be able to delete sensitive data from a lost or stolen mobile device via the gateway, if and when required. This aspect of the invention is discussed in further detail below.

Dedicated Application Environments

According to this aspect of the present invention, a mobile device may be configured with two or more application environments, each of which may be dedicated to a certain or predefined role. For example, a mobile user may have an IPHONE that is adapted to provide a work environment having his work-related applications such as a delivery route manager, as well as a personal environment having his personal applications such as a photo album. These environments may be manually or automatically enabled/disabled, such as running the work environment from 9 AM to 5 PM on Monday through Friday, while the personal environment is accessible at all or other times. These different environments may have different user interfaces, device settings (such as, for example, email), etc.

HTTP-Based Push Technology Implementation

In another aspect of the present invention, the features described herein are implemented using an HTTP based push technology, such as the Bayeux protocol. As known in the art, Bayeux is a protocol for transporting asynchronous messages (primarily over HTTP), with low latency between a web server and a web browser. Rather than using a pull technology as in the prior art, wherein the browser (or other) software on the mobile client device must request data via an HTTP channel in order for the server to send data, the Bayeux-based implementation of the present invention enables the server to push data to the mobile client as desired. It will be appreciated that the present invention's use of HTTP(s)-based communication allows for and facilitates the secure communication of data with two-way authentication (client and server), while also allowing seamless transport through firewalls. Reference is also made to FIG. 29 is this respect.

Offline Application Execution

According to yet another aspect of the present invention, applications are able to execute on a mobile client device while that mobile device is offline. For example, a mobile user may be using a field service application to send data to an enterprise server via the gateway, and may enter an area of poor or no wireless communications with the gateway. The mobile applications of the present invention are configured to continue to execute, store data offline and/or place data messages in a transmission queue, until such time as a valid wireless connection is re-established with the gateway. The queued data messages are thereafter able to begin to transmit in a seamless manner and the mobile user may continue to operate the device as if no break in communications had occurred.

Transaction Logging

According to still another aspect of the present invention, data messages sent through the gateway (either from enterprise server to a mobile client or from a mobile client to enterprise server), the transaction is recorded and provided with a time stamp. Acknowledgements are recorded so that there is a record of when each data message was received by the gateway, re-transmitted to the intended recipient, received by the recipient, opened (and presumably read) by the recipient, and acted upon by the recipient. Other information may be logged, such as the state and configuration information of a mobile device. For example, the transaction logs will indicate if that device has recently communicated with the gateway.

By recording and maintaining accurate and detailed transaction logs, the gateway is able to provide the user of the present invention with either (1) a guaranteed delivery of a data message, or (2) a notification of a delivery failure. Since the gateway implements a multi-tenant architecture, it is able to serve a plurality of different enterprise servers and mobile client devices at the same time by properly routing the transaction and logging a time stamp of that transaction.

Multiple Application Execution and Hybrid Application Architecture

Mobile devices typically have less functional capabilities than more robust desktop computers. Mobile device operating systems such as the IPHONE currently allow only a single application to be executed at a given time. The present invention provides for the ability for multiple applications to be executed simultaneously on an IPHONE under what is labeled the "Enterprise Workbench". The Enterprise Workbench provides to a mobile employee the ability to utilize all of the applications deemed necessary for that person to execute his required job functions throughout the workday. By way of example only, a mobile worker may need to have a field service application as well as an instant messaging (IM) application running simultaneously.

Figure 2:
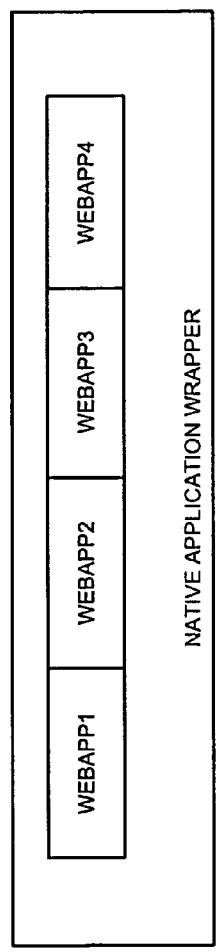
FIG. 2 is an illustration of a native application as a wrapper for a group of web applications.

The application manager in an illustrated embodiment of the present invention enables multiple web apps to execute simultaneously. In the IPHONE embodiment, the IPHONE operating system only "sees" one application running, while the embedded web apps continue to execute. The Workbench application is a native IPHONE application written in Objective-C and creates a wrapper where other applications written in JavaScript and HTML5 will run. Notably, each application can execute as a standalone web app by itself, or as part of the bundle in the native Workbench application. FIG. 2 is illustrative.

As currently known in the art, there are two different ways to implement an application on the IPHONE mobile device. A native IPHONE application may be written in Objective-C and then made available to all users via the ITUNES APP STORE, or other means as provided for by Apple Computer, Inc. In the alternative, a web app may be written in JavaScript and HTML-5 (web apps were available prior to the implementation of the ITUNES APP STORE). The present invention implements a third type that exhibits hybrid functionality of the first two types. We utilize a native application as a wrapper for encasing a relatively small number of web apps. Thus, the Enterprise Workbench according to the present invention comprises a hybrid application that enables a user to access a number of web apps, all of which may execute simultaneously as described herein. This is shown in logical format in FIG. 2.

Web App Notification Scheme

Figure 3:
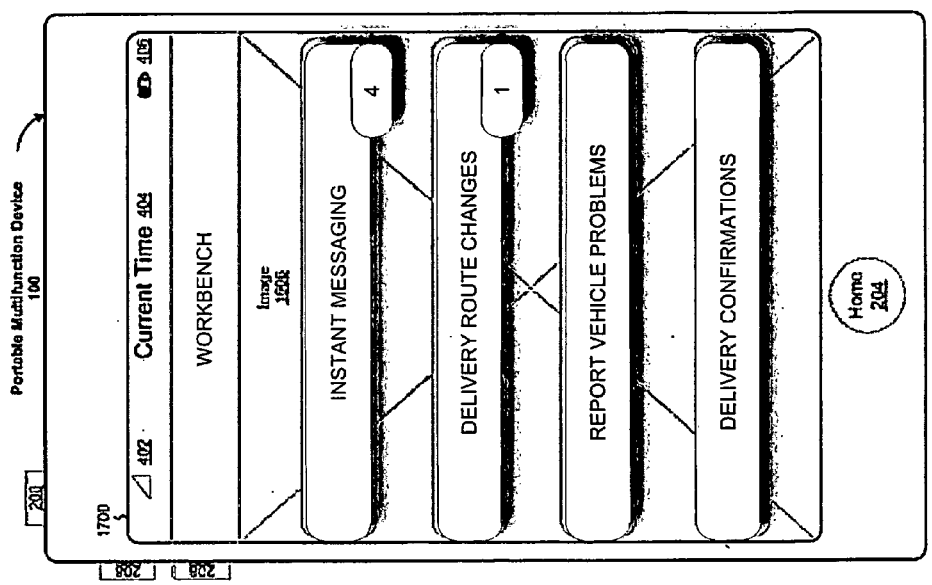
FIG. 3 is an illustrative screen shot of multiple web applications ("apps") running with notification badges in an illustrative IPHONE embodiment.

Native IPHONE applications such as the IPHONE email program, telephone applications, and instant messaging application, implement a notification badge system to alert users that actions need be taken for that application. For example, if a user has three unread email messages, then a small icon with the numeral "3" is displayed in juxtaposition to the email application icon. However, web applications, which run on browser clients, do not typically have access to the underlying operating system or APIs, and thus are not known to have been able to implement such a notification system. The communication stack implemented according to the present invention enables the web apps to utilize notifications. As described further herein, notifications from a web app will be made available to the user via the communication stack and, as a result, the present invention associates a notification with a particular web app. For example, if the instant messaging (IM) web app of the present invention has two new IMs available to the user to read, a notification badge with the numeral "2" will be displayed in association with that web app. These notifications may be displayed using the telecom industry standard color scheme (red/yellow/green/blue for critical/major/minor/info; respectively). FIG. 3 is illustrative.

Cross-Platform Implementation

Although a preferred embodiment of the present invention has been described with respect to the IPHONE implementation, it should be appreciated and understood that the present invention has applicability to and is capable of use with other mobile computing platforms such as BLACK-BERRY and PALM, as well as well as with Windows Mobile devices such as, by way of example only, the SYMBOL MC70 and HTC's TILT. Furthermore, this invention may be used with devices of computer manufacturers who provide small, lightweight mobile computers known as tablets and netbooks, in addition to well known laptop computers. The environments within which the present invention is capable of functioning include any number of existing as well as emerging Web clients such as, without limitation, hypertext markup language (HTML5, for example), environments incorporating "persistence" characteristics which facilitate retention of data structures between program executions, and those employing asynchronous server communications, to name but a few. By implementing a series of web applications, functions are capable of being ported to and amongst the various platforms.

Route Driver Example

Figure 5:
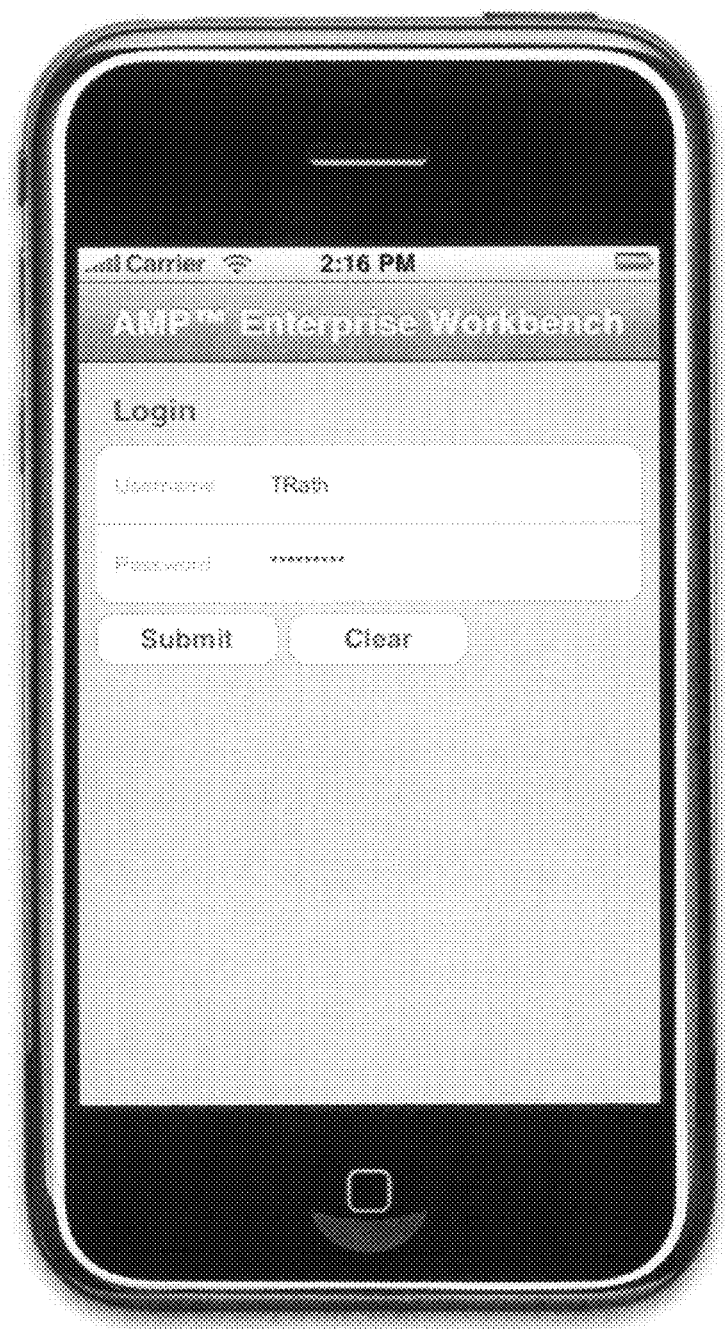
FIGS. 5-22 illustrate various screen shots of an aspect of the present invention that executes on an IPHONE, in particular.
Figure 6:
Figure 7:
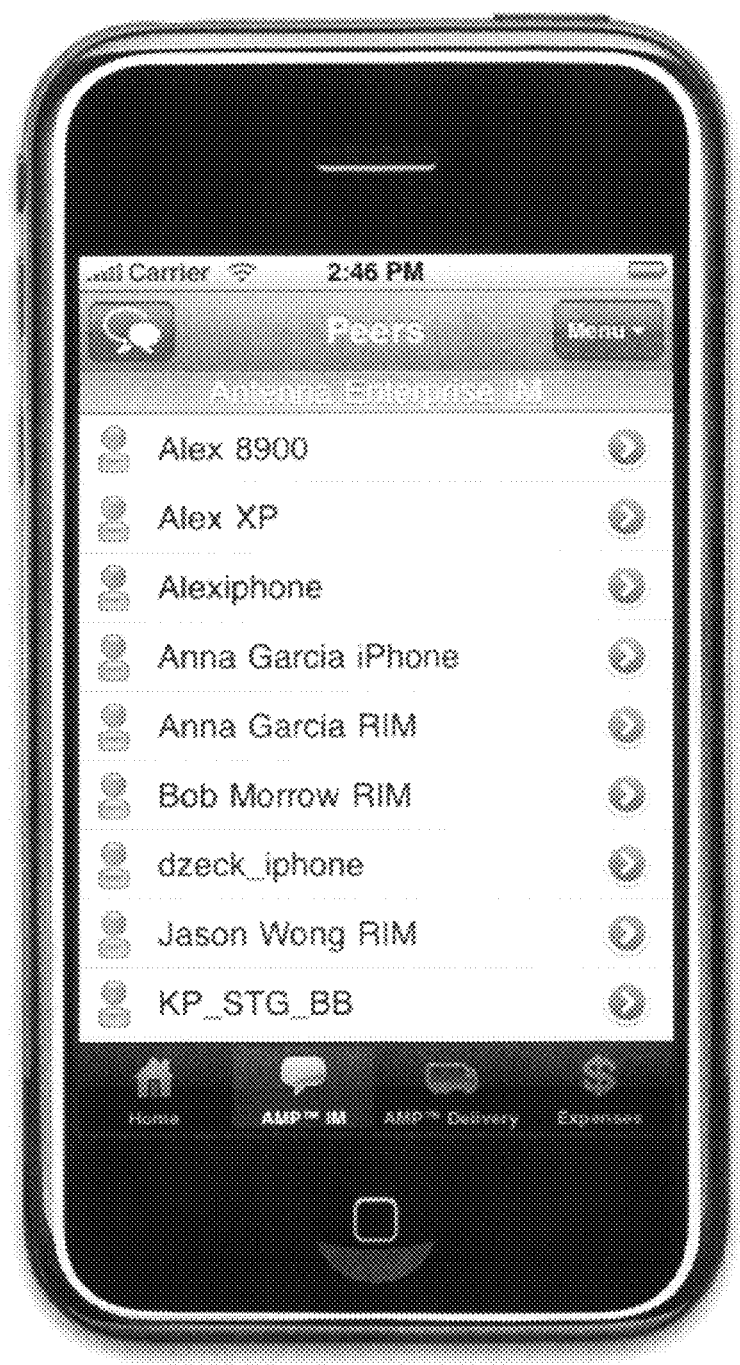
Figure 8:
Figure 9:
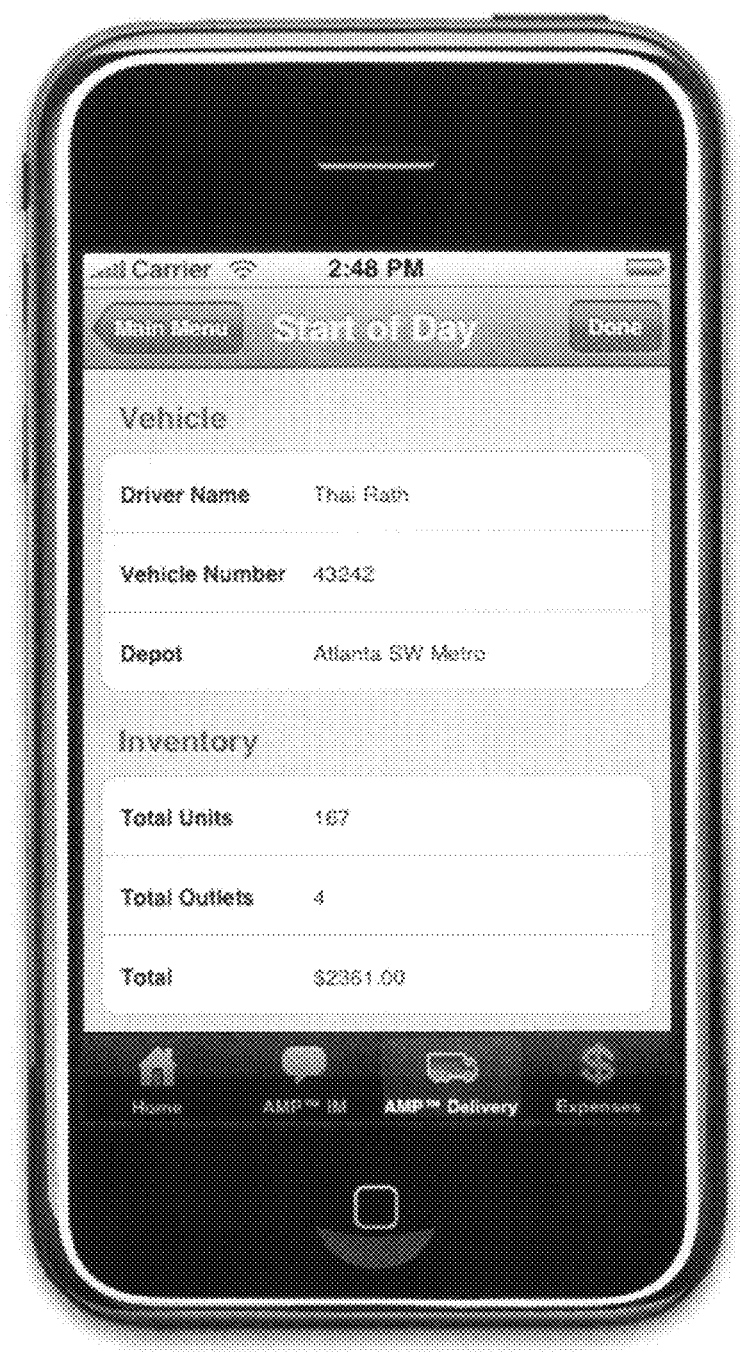

To illustrate a working example of the implementation of the present invention, as utilized by a driver on a package delivery route, the driver will first log his mobile device into his/her employer's system at the beginning of the work day. The present invention will then support the following functions:
  Access to delivery route
  Inventory tracking
  Package delivery acknowledgement from customers (e.g. image from on-board camera, signature capture, etc.)
  Vehicle problem reporting (e.g. flat tire, broken air conditioner)
  Instant messaging (can communicate with dispatcher or other drivers)
  Emails & telephone calls
  Position tracking (using location services of underlying OS)
  Telematic data from the vehicles (e.g. if speed limits exceeded)
  Changes to route (e.g. last minute pick up not on initial route)
  Returns and pickups
  End of day/logoff
  FIGS. 5-22 illustrate various screen shots of this aspect of the present invention that executes on an IPHONE, such as the IPHONE 3G or the newer IPHONE 3GS.
  FIG. 5 illustrates a Login screen for the AMP ENTERPRISE WORKBENCH native IPHONE application. The AMP ENTERPRISE WORKBENCH application may be loaded by a user onto the device from the ITUNES APP STORE, according to a procedure known in the art. When the user executes this loaded application, he (assuming the user is male) will be presented with the Login screen of FIG. 5, in which he enters his user name and password provided by the system administrator. The user may then be authenticated in the device locally, at the gateway, or at the server (or in a multiple-part process involving, for example, two of these locations). This provides the entry point for this mobile user into the system.
  As previously described, the AMP ENTERPRISE WORKBENCH application is a native IPHONE application that provides a bundle of web apps used by the mobile user. Once logged in, the Home screen of FIG. 6 will be presented. FIG. 6 illustrates the Home screen of the AMP ENTERPRISE WORKBENCH with three web apps executing, although more or less may be used in practice. In this example, the three web apps available to the user are (1) Instant Messaging (IM), (2) Delivery, and (3) Expenses. The three web apps are available from the Home Screen, or may be selected directly at any time from any screen by pressing (selecting) the desired button on the tab bar, which is a shortcut for the user. These illustrated web apps are a suite of bundled apps that have been configured for use by this particular mobile user as identified by his login. Other web app bundles may be made available to other users based upon their particular role or identity.
  Also shown in FIG. 6 are two notification badges, as previously described. Here, this user is notified that there is one Delivery notification (e.g. a new stop has been added to his route in real-time during the workday), and there are four Expense notifications (e.g. four of his expense submissions need attention, or have been approved, etc.). The user is able to select the desired app from the Home screen (or shortcut bar) to view the notifications as desired.
  FIG. 7 illustrates a Peer listing used in the IM Application which has been selected by the user. The tab bar shows the selected web app by highlighting the appropriate icon. This Peer listing shows the available peers with whom this user may initiate an IM session, such as another driver in a nearby route. For example the user may need to get information from the other driver, and the IM web app provides a means to accomplish this. In the illustrated embodiment, the IM web app runs off of an IM server hosted at the gateway, which enables advanced logging features for the enterprise. Also shown in FIG. 7 is a Menu button which, when selected, will provide the pop-up menu of FIG. 8. This displays several menu items such as Group Chat (for multiple participants), Settings, and Status (Online).
  FIG. 9 illustrates a Start of Day screen that is accessed by selecting the Delivery icon from the Home screen or the appropriate tab bar from any other screen. This screen displays Vehicle information including the driver name, vehicle number, and the depot from which the delivery truck is originating. This screen also displays Inventory information including Total Units on the truck, Total Outlets (stops) to be delivered to (or picked up from) such as grocery stores, and the total value of the units to be collected or invoiced at the outlets. Total Units may be measured in boxes, palettes, or other units of measure.

Figure 10:

FIG. 10 illustrates a Route screen which shows the driver the delivery outlets that he is scheduled to visit during the day, and this may be accessed by pressing the Done button on FIG. 9. Here, the four stops to be made are shown in detail, in the particular order that has been predetermined to provide the most efficiency. So, in this illustrated case, the driver would stop at Kroger #2004, then proceed to Publix #115, then to Kroger #2005, and then to Publix #116. The address of each outlet is displayed on this Route screen. In addition, the driver may access driving directions (shown in FIG. 14) by pressing the arrow key next to the outlet name, and/or a route map (shown in FIG. 15) by pressing the map button on the Route screen. These functions utilize the native map and GPS functionalities that are provided in the IPHONE platform.

Figure 11:

FIG. 11 illustrates the Route screen of FIG. 10 that has been updated with an additional outlet during the driver's workday. In this example, a request has come in to the applicable enterprise server for a driver to make a pick up at the Whole Foods Market #5. This transaction request is then "pushed" to the appropriate driver's IPHONE through the gateway as described above. The IPHONE will receive the transaction request, acknowledge its receipt back to the gateway, and then display a notification badge (and/or beep or vibrate) so that the driver is alerted to this change in his scheduled itinerary for the day. The Delivery app is capable of sorting this and presenting this to the driver in the appropriate location on the outlet list corresponding to maximum driving efficiency. The driver may then press the new selection to obtain additional details about this added stop.

Figure 12:
Figure 13:
Figure 14:
Figure 15:
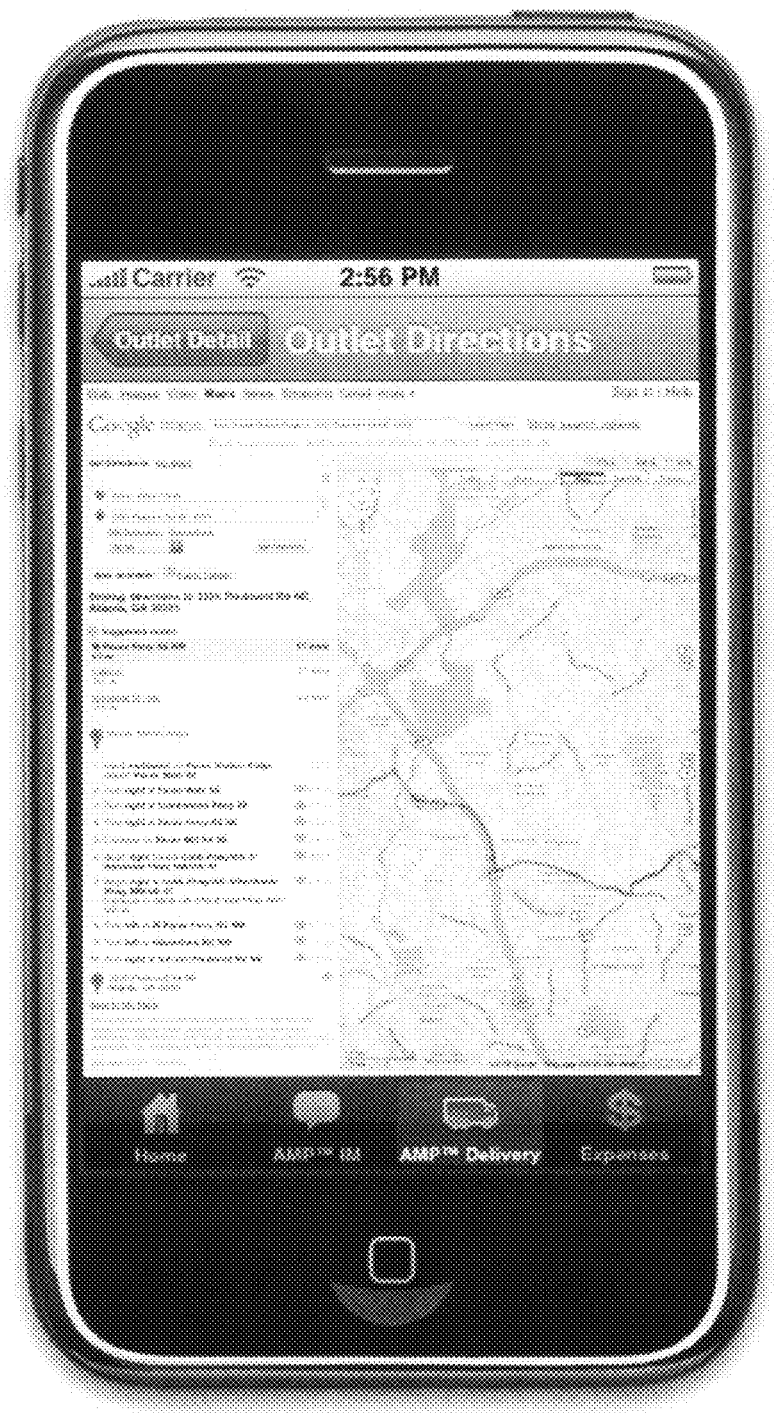

FIG. 12 illustrates an Outlet Detail screen of the Kroger #2004 outlet stop. This shows the name, phone number, address, etc. The driver may call the outlet directly, if desired, by simply pressing the phone number button, and then FIG. 13 illustrates the direct calling link from the Outlet Detail screen, in a manner known in the art.

Figure 16:
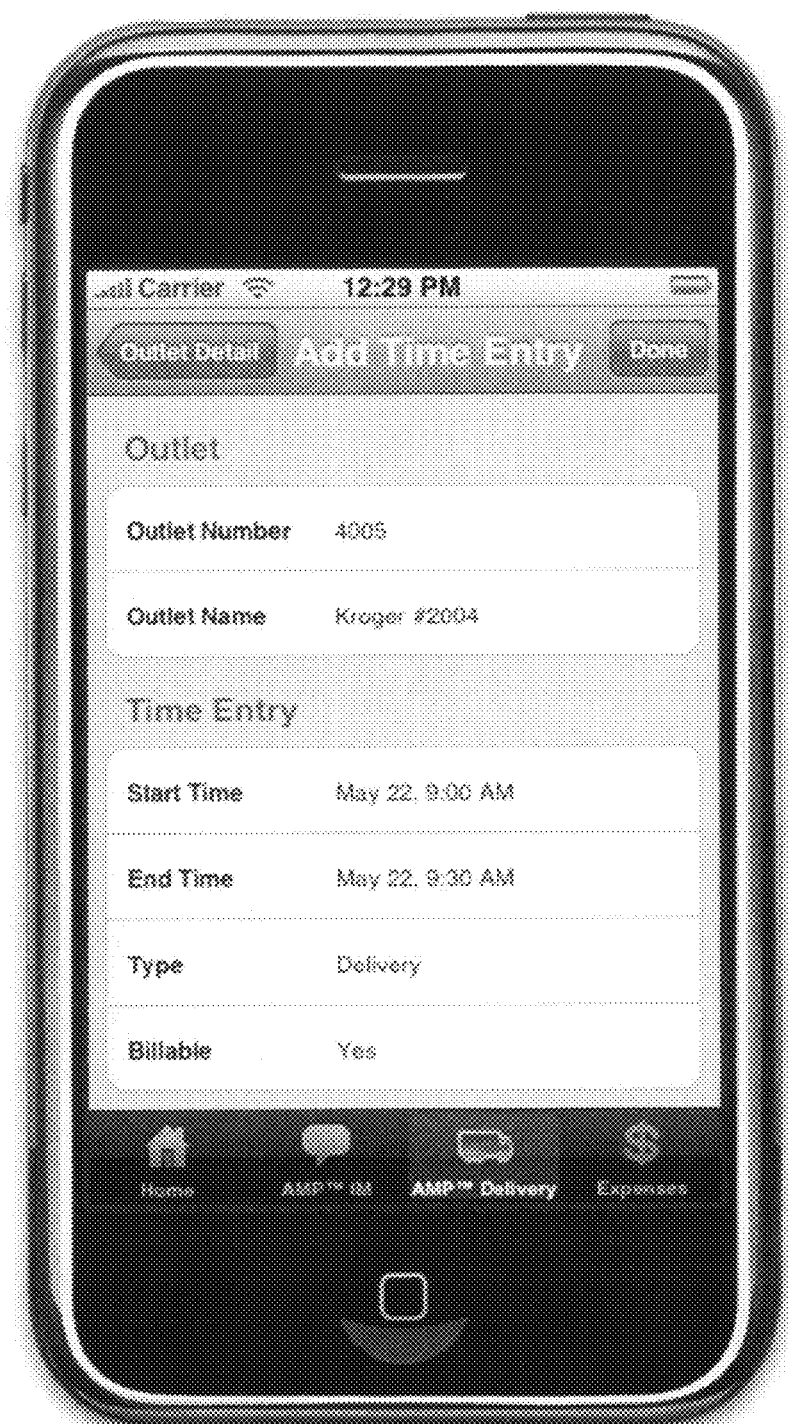

FIG. 16 illustrates the Add Time Entry screen that may be accessed by the driver from the Outlet Detail screen of FIG. 12. Here, the driver enters pertinent information such as start time and end time, which may, for example, be entered by simply pressing (selecting) a button selection and having the operating system of the IPHONE make the desired entry in accordance with the associated clock function.

Figure 17:
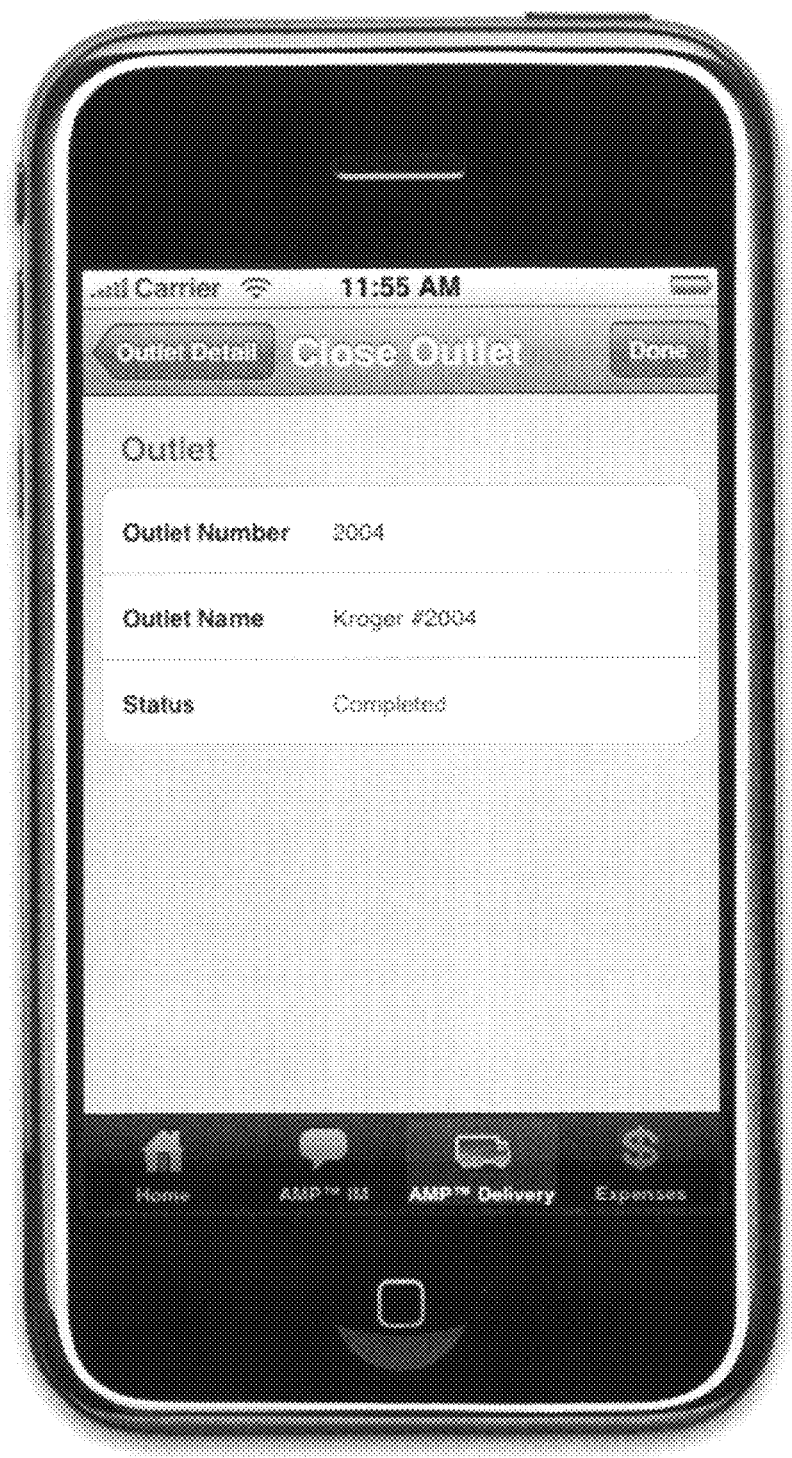
Figure 18:
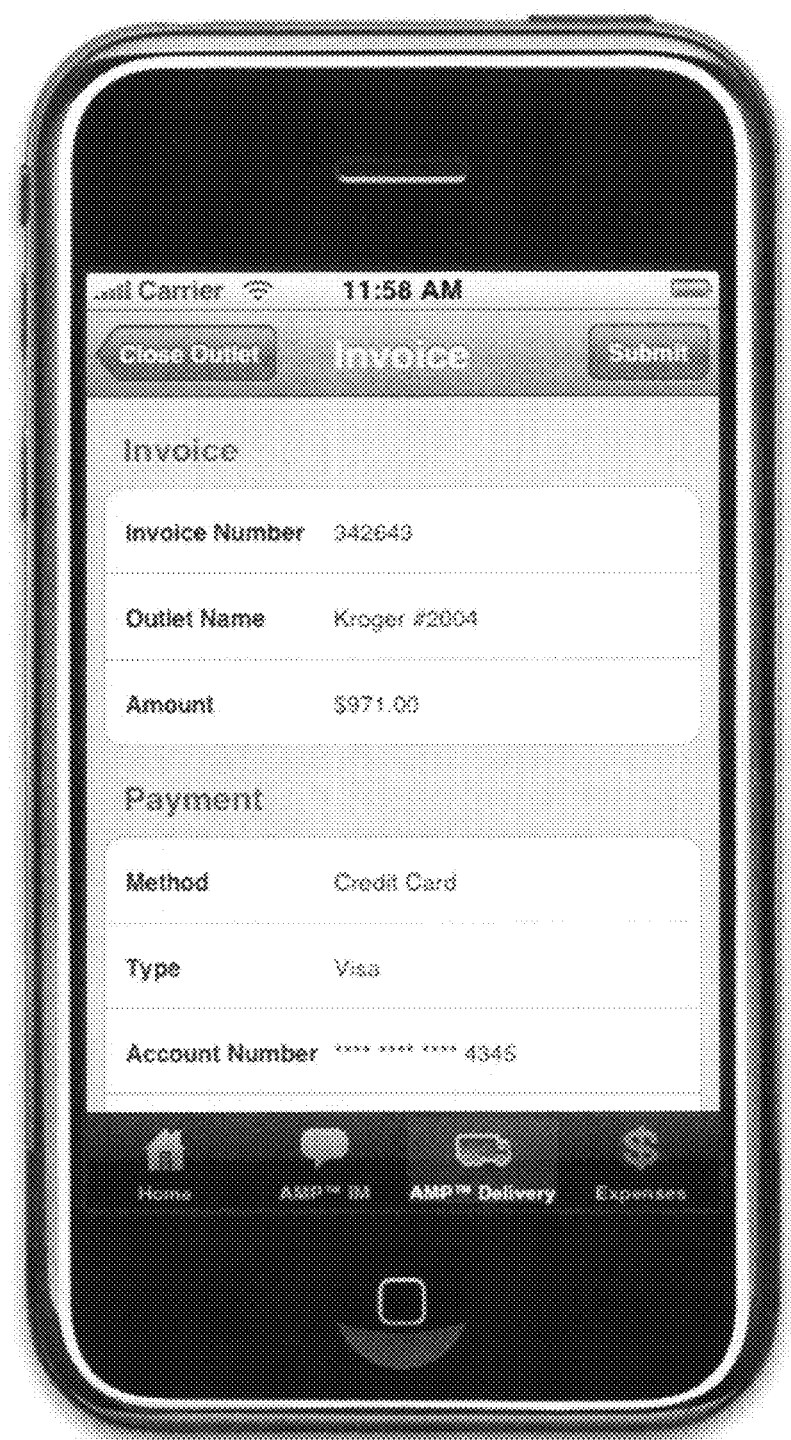
Figure 19:

FIG. 17 illustrates the Close Outlet screen that may be accessed by the driver from the Outlet Detail screen of FIG. 12, in which the driver closes out his outlet after the items are delivered to that outlet. FIG. 18 illustrates the Invoice screen that may be accessed from the Close Outlet screen of FIG. 17, in which the driver may either collect credit card information, or enable electronic billing if that has been previously established and set up, as between the driver's employer and that outlet. FIG. 19 illustrates a Signature capture screen that may be accessed from the Invoice screen of FIG. 18 in which appropriate signatures may be entered and stored for transaction logs.

Figure 20:
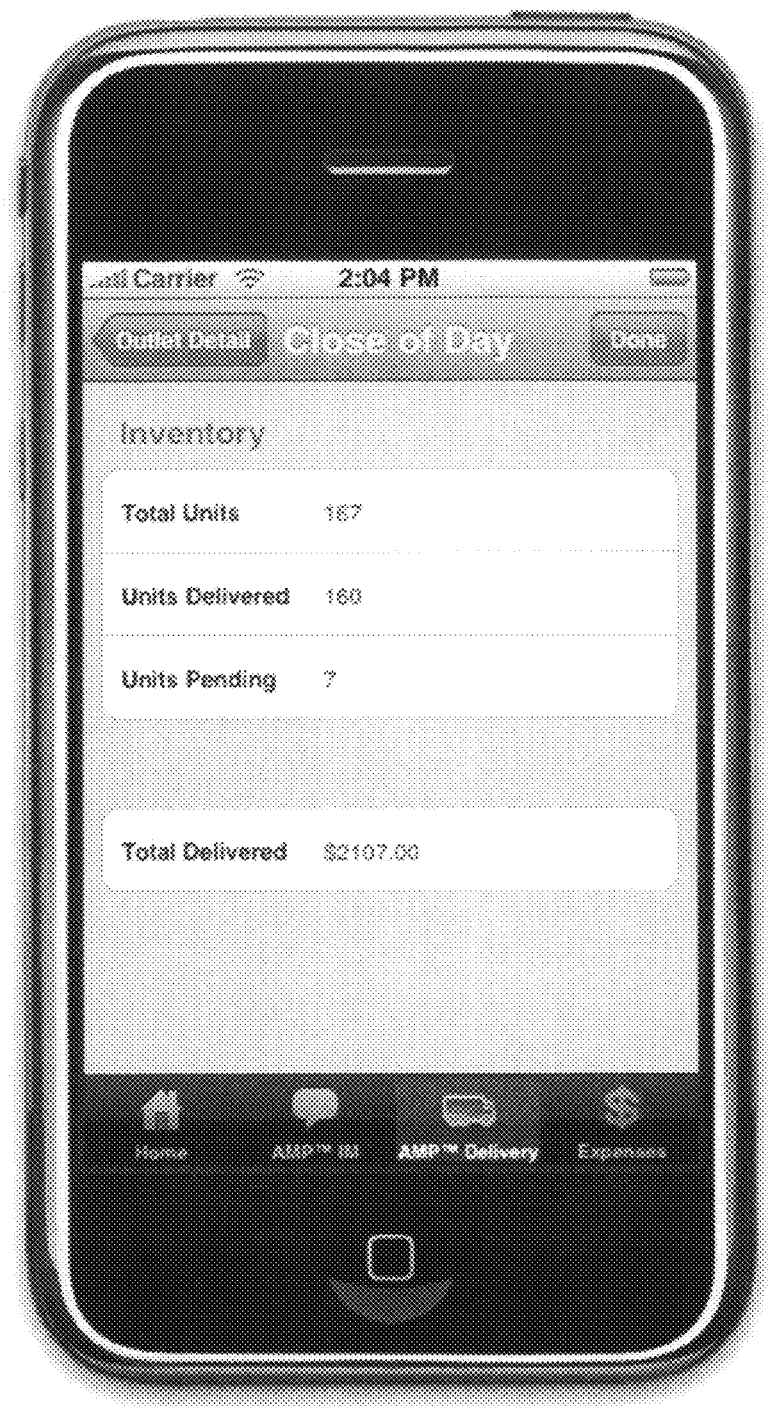

FIG. 20 illustrates the Close of Day screen that may be accessed from the Outlet Detail screen of FIG. 12. This screen is used after the driver has completed all of his outlet deliveries and pickups. This shows, for example, the total units, units delivered, and units pending (which may be undeliverable due to damage, etc.).

Figure 21:
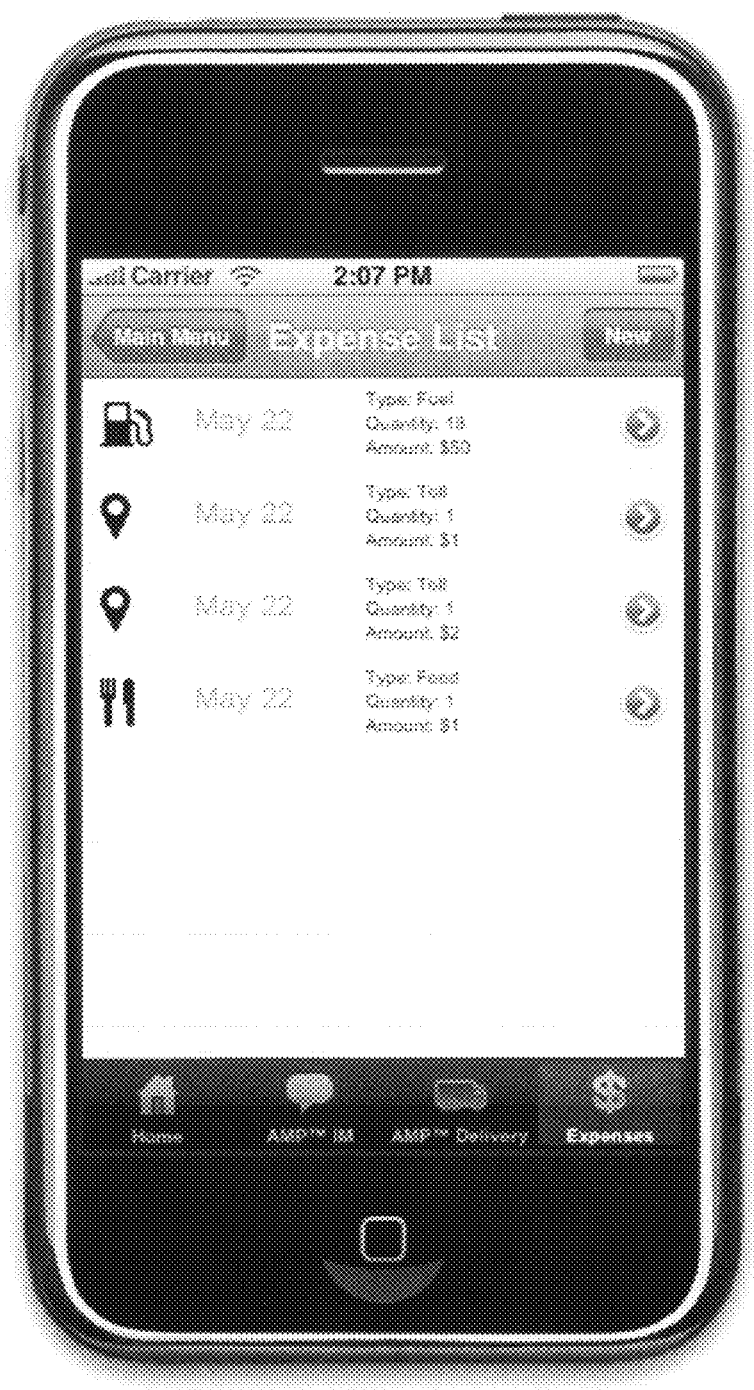
Figure 22:

FIG. 21 illustrates the Expense List web application that may be accessed from the Home screen of FIG. 6 or from a tab bar shortcut from any screen. This lists all of the expenses that have been previously entered by the driver, and enables him to enter a new expense item. FIG. 22 illustrates the Expense Detail screen that may be accessed from the Expense List screen of FIG. 21.

Again, it is within the scope of the present invention to contemplate uses with what are commonly referred to as "Web devices" and/or "Web clients".

Mobile Device Enrollment and Provisioning Details

A preferred process whereby a new user enrolls and adapts his mobile device to provision and execute the native application wrapper (code named BRAEBURN) is now discussed in further detail. In the example of an IPHONE, a new user will use the ITUNES Store to download the native application BRAEBURN in the same manner as he would download any other IPHONE application. The user will install the native application BRAEBURN onto his IPHONE, and the application icon will appear on his screen of choice as shown in FIG. 23. The BRAEBURN application will execute for the first time and will communicate with the gateway to enroll and provision the IPHONE device as shown in FIG. 31. During the enrollment process the pop-up screen of FIG. 24 will appear on the display. The custom web apps will then be installed on the mobile device and the screen of FIG. 25 will be displayed (which in this example provides for three different web apps—IM, Pharma, and Sales). FIG. 26 illustrates the main page of the IM web app, FIG. 27 illustrates the main page of the Pharma app, and FIG. 28 illustrates the main page of the Sales app.

FIG. 31 illustrates a functional block diagram of preferred IPHONE mobile device enrollment and provisioning software modules in the central gateway that are used in the enrollment and provisioning processes. The Mobile Manager is a back-end system that sets up mobile devices and provisions the applications on the mobile devices. The Mobile Manager is configured with information relating to the particular web applications that are to be downloaded to each particular user. In addition, a specific device, which is identified by its unique identification number, will be associated with a particular user. Any user may have multiple devices associated with him. For example, user John Smith may have an IPHONE and a BLACKBERRY mobile device associated with him via the enrollment process.

During the enrollment process, the mobile device communicates with the Profile Service, which provides the interface to the mobile device and the logic associated with the enrollment and provisioning process. The Mobile Manager is used by the Profile Service to identify the web applications that should be installed within a user's native application (BRAEBURN). In addition, the Mobile Manager is currently being used as an authentication server that the Profile Service can query, however the design allows for the Profile Service to use other forms of authentication services such as Active Directory or LDAP authentication. These web applications are stored on the mobile device and are able to execute in an offline (unconnected) mode as well as an online mode, as previously described.

In a preferred embodiment, SCEP (Simple Certificate Enrollment Protocol) is the recommended protocol to be used for configuration of the mobile device such as the IPHONE. SCEP is a protocol known in the industry and adapted for use in the present invention as follows.

Reference is now made to the flow diagram of FIG. 29, which illustrates the device authorization, enrollment, and web application installation steps as the IPHONE interacts with the various software modules illustrated in FIG. 31. Each step shown on the far right side of FIG. 29 is explained below.

Step 1—In step 1, the native application wrapper is configured on initial startup to send an enrollment request to the Profile Services server. This enrollment request starts the identity verification process. The Profile Services server responds to the enrollment request with a request for credentials message (authentication request) that is sent back to the IPHONE mobile device.

Step 2 (user verification)—In step 2, the native application then sends the user ID (which may be an email address) and password credentials that were entered by the user. The Profile Services server relays the user credentials to the Mobile Manager, which checks its database to verify that the user ID and password are valid entries. Assuming this is a valid user/password pair, then a user valid message is sent by the Mobile Manager back to the Profile Services server, and the Profile Services server sends a device information request to the native application on the mobile device.

Step 3 (device verification)—In step 3, the native application sends back a device profile that has been digitally signed using the native application's identity (which has the unique device ID and the software version of the device). The unique device ID is then forwarded to the Mobile Manager, which initiates a database search to verify that the subject device is authorized. The Mobile Manager will send back a device valid message to the Profile Services server. The Profile Services server then sends to the mobile device an SCEP payload that contains the URL of the appropriate Certificate Authority.

Step 4—In step 4, the native application then requests the CA Certificate from the Certificate Authority by using the URL from step 3. This public key from this certificate is used to encrypt the following CSR.

At this point, the user, the device, and the native application have been verified as valid by the system. Next, the web applications specific to this user will be downloaded to the mobile device.

Step 5—In step 5, the native application communicates with the Certificate Authority via the URL from step 3 and requests a signed certificate. The native application then receives a certificate signed by the Certificate Authority in return. The issuance of a certificate is predicated on the native application supplying a valid one time authentication token. This token is generated by the Profile Service and is delivered to the device in the previous SCEP payload. This ensures that the CA is protected from unsolicited certificate requests.

Step 6—In step 6, the native application sends a device information request to the Profile Services server, signed with the certificate obtained in step 4 above. The Profile Services server communicates with the Mobile Manager to retrieve the web application list for the subject device. The reply is sent by the Mobile Manager to the profile services server, which in turn sends a signed mobile configuration profile to the mobile device with the web clips.

Steps 7-9—Here, the web application retrieval and installation are repeated by communications with the Web Applications Hosting server for each web app in the mobile configuration.

Step 10—In step 10, the web applications appear in the native application and communicate with their respective web app servers via the A sync HTTP gateway interface, as shown in FIG. 30

Each time the native application is subsequently launched a device information request is sent to the profile service, which results in a signed mobile configuration file being delivered to the device. Any changes to the device's manifest at the Mobile Manager will then be reflected at the device by either web application removal, or installation by means of steps 7, 8, 9 & 10.

In another aspect of the present invention, a two-factor authentication process is utilized such as with an RSA token. In this case, the user would need the token for login to the native application. The use of physical tokens, per se, for two-factor authentication is well known in the art.

Inter-Application Communications

In a further aspect of the invention, the web applications are enabled to communicate with each other by exchanging messages back and forth. For example, when a first web application requires an action by a second web application, an appropriate message will be passed from the first web application to the second web application. The second web application will execute any required steps and then pass a response message back to the first web application, accordingly. These inter-application messages will occur on the mobile device itself, without the requirement of communicating with any external server. This is advantageous over the prior art, in which a second application may be invoked from a first application, but where there is no ability to automatically return back to the first application as in the present invention. For example, in the prior art IPHONE device, a user may click an HTML link in an email message, which will cause the web browser (SAFARI) to launch with that link, and which will close the Mail application rather than keeping an interactive messaging dialog.

For example, in the present invention, a field service application may pass a message to an instant message (IM) application that will enable an IM conversation to occur until complete, and then the IM application will pass control back to the field service application so it may pick up where it left off. In this example bit the IM application and the field service application may execute simultaneously and pass information back and forth between them.

In the preceding specification, the present invention has been described with reference to specific exemplary embodiments thereof. It will, however, be evident that various modifications and changes may be made thereunto without departing from the broader spirit and scope of the present invention. The specification and drawings are, accordingly, to be construed in an illustrative rather than a restrictive context.

What is claimed is:

1. A system for exchanging data between mobile devices and one or more servers, the system comprising:
   one or more first interfaces for enabling communication with the mobile devices via a communication network;
   one or more second interfaces for enabling communication with the servers via a wide area network;
   a Transaction Logging module for logging the data or data messages being exchanged between the mobile devices and the one or more servers, said Transaction logging module being configured to communicate with the one or more first interfaces and the one or more second interfaces where said Transaction Logging module records time of system reception of data or data messages from the mobile devices and/or the one or more servers and records time of system transmission of data or data messages to the mobile devices and/or the one or more servers;
   a Profile Service module configured to communicate with the one or more first interfaces to authenticate and configure the mobile devices;

a Mobile Manager module configured with information relating to applications to be automatically downloaded to the mobile devices, the Mobile Manager module being further configured to communicate with the one or more first interfaces and the Profile Service module where the Profile Service module uses the Mobile Manager to identify the particular applications to be automatically downloaded to particular mobile devices and the particular applications to be included in Workbench applications which when downloaded onto a mobile device allow simultaneous execution of multiple applications by said mobile device and where all applications downloaded onto a mobile device are configured to communicate with each other within the mobile device;

an Applications Host module containing applications, said host module being configured to communicate with the Mobile Manager module and the one or more first interfaces and is further configured to communicate with the Mobile Manager to obtain authorization to download the applications to the mobile devices; and an Application Platform module configured to communicate with the one or more first interfaces for exchanging data messages between downloaded applications at the mobile devices and applications at the servers.

2. The system of claim 1 whereby said system is implemented with a central gateway.

3. The system of claim 1 where the communication network is a wired or wireless network.

4. The system of claim 1 where the applications are Web applications.

5. The system of claim 1 where the wide area network is the Internet.

6. The system of claim 1 where the mobile devices can be configured with two or more application environments each of which may be dedicated with a predefined role.

7. The system of claim 1 where a Bayeux-based communication protocol is used to allow servers to push data to the mobile devices as desired.

8. The system of claim 1 where the Transaction logging module further can log state and configuration information of a mobile device.

9. The system of claim 1 implemented as a multi-tenant gateway able to serve a plurality of different enterprise servers and mobile devices at the same time.

10. The system of claim 1 where a Simple Certificate Enrollment protocol is used in the configuration of the mobile devices.

* * * * *